US009783621B2

(12) United States Patent
Nguyen et al.

(10) Patent No.: US 9,783,621 B2
(45) Date of Patent: *Oct. 10, 2017

(54) PRESSURE RELIEF FOR MULTIPLE POLYOLEFIN POLYMERIZATION REACTORS

(71) Applicant: Chevron Phillips Chemical Company LP, The Woodlands, TX (US)

(72) Inventors: Thanh T. Nguyen, Sugar Land, TX (US); Ralph Romig, Kingwood, TX (US); Carolyn Lehman, Kingwood, TX (US); Joel Mutchler, Kingwood, TX (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,468

(22) Filed: Feb. 16, 2016

(65) Prior Publication Data

US 2016/0159938 A1 Jun. 9, 2016

Related U.S. Application Data

(63) Continuation of application No. 14/031,183, filed on Sep. 19, 2013, now Pat. No. 9,295,964.

(51) Int. Cl.
| | | |
|---|---|---|
| *C08F 2/00* | (2006.01) | |
| *B01J 19/00* | (2006.01) | |
| *C08L 23/06* | (2006.01) | |
| *B01J 19/18* | (2006.01) | |
| *C08F 2/01* | (2006.01) | |

(52) U.S. Cl.
CPC ............ *C08F 2/001* (2013.01); *B01J 19/002* (2013.01); *B01J 19/0006* (2013.01); *B01J 19/1837* (2013.01); *B01J 19/1862* (2013.01); *C08F 2/01* (2013.01); *C08L 23/06* (2013.01); *B01J 2219/002* (2013.01); *B01J 2219/0027* (2013.01); *B01J 2219/00063* (2013.01); *B01J 2219/00065* (2013.01); *B01J 2219/00094* (2013.01); *B01J 2219/00162* (2013.01); *B01J 2219/00204* (2013.01); *B01J 2219/00211* (2013.01); *B01J 2219/00231* (2013.01); *B01J 2219/00236* (2013.01); *B01J 2219/00259* (2013.01); *B01J 2219/00272* (2013.01)

(58) Field of Classification Search
CPC . C08F 2/001; C08F 2/01; B01J 19/006; B01J 19/002; B01J 19/1837; B01J 19/1862; B01J 2219/00063; B01J 2219/00065; B01J 2219/00094; B01J 2219/00162; B01J 2219/002; B01J 2219/00204; B01J 2219/00211; B01J 2219/00231; B01J 2219/00236; B01J 2219/00259; B01J 2219/0027; C08L 23/06

See application file for complete search history.

(56) References Cited

U.S. PATENT DOCUMENTS

| | | | |
|---|---|---|---|
| 3,244,681 | A | 4/1966 | Rohlfing et al. |
| 4,469,560 | A | 9/1984 | Morgan |
| 6,173,027 | B1 | 1/2001 | Saito et al. |
| 6,716,936 | B1 | 4/2004 | McGrath et al. |
| 7,015,289 | B2 | 3/2006 | Hottovy et al. |
| 7,342,079 | B2 | 3/2008 | Sher et al. |
| 7,696,288 | B2 | 4/2010 | Fouarge |
| 7,999,044 | B2 | 8/2011 | Hottovy et al. |
| 9,295,964 | B2 * | 3/2016 | Nguyen et al. ........ B01J 19/002 |
| 2004/0253151 | A1 | 12/2004 | Nguyen |
| 2010/0056707 | A1 | 3/2010 | Hottovy |
| 2010/0331500 | A1 | 12/2010 | Dewachter et al. |
| 2011/0311014 | A1 | 12/2011 | Hottovy et al. |

FOREIGN PATENT DOCUMENTS

| | | |
|---|---|---|
| EP | 1195388 A1 | 4/2002 |
| WO | 2004109417 | 12/2004 |
| WO | 2011095532 | 8/2011 |
| WO | 2011162961 | 12/2011 |

OTHER PUBLICATIONS

ASME International, "Rules for Construction of Pressure Vessels," 3 pgs, Jul. 1, 2006, The American Society of Mechanical Engineers, New York, NY.

* cited by examiner

*Primary Examiner* — Nathan M Nutter
(74) *Attorney, Agent, or Firm* — Eversheds Sutherland (US) LLP

(57) ABSTRACT

A polyolefin manufacturing system and method including polymerizing olefin in a first reactor to form a polyolefin, transferring the polyolefin to a second reactor, polymerizing olefin in the second reactor, and discharging a product polyolefin from the second reactor. The system and method including operating the first reactor with a first reactor pressure relief system and the second reactor with a second reactor pressure relief system, both pressure relief systems to discharge to a flare system, and wherein a relief instrumented system (RIS) is configured to direct at least one process interlock that mitigates an excess reaction scenario as an overpressure relief scenario.

24 Claims, 4 Drawing Sheets

PRESSURE RELIEF FOR MULTIPLE POLYOLEFIN POLYMERIZATION REACTORS

BACKGROUND

1. Field of the Invention

The present invention relates generally to a relief system in polyolefin production with multiple polymerization reactors and, more particularly, to a closed pressure relief system and interlock system for multiple polyolefin polymerization reactors.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such as thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the shore-chain olefin molecules (monomers and comonomers), such as ethylene, propylene, butene, pentene, bexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "power" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, and so forth, may affect the fluff properties.

In addition to the one or more olefin monomers, a catalyst (e.g., Ziegler-Natta, metallocene, chromium-based, post-metallocene, nickel, etc.) for facilitating the polymerization of the monomers may be added to the reactor. For example, the catalyst may be a particle added via a reactor feed stream and, once added, suspended in the fluid medium within the reactor. Unlike the monomers, catalysts are generally not consumed in the polymerization reaction. Moreover, an inert hydrocarbon, such as isobutane, propane, n-pentane, i-pentane, neopentane, n-hexane, and/or heptane, and so on, may be added to the reactor and utilized as a diluent to carry the contents of the reactor. However, some polymerization processes may employ monomer as the diluent, such as in the case of selected examples of polypropylene production where the propylene monomer itself acts as the diluent. Nevertheless, the diluent may mix with fluff and other components in the reactor to form a polymer slurry. In general, the diluent may facilitate circulation of the polymer slurry in the reactor, heat removal from the polymer slurry in the reactor, and so on.

The slurry discharge of the reactor typically includes the polymer fluff as well as non-polymer components such as unreacted olefin monomer (and comonomer), diluent, and so forth. This discharge stream is generally processed, such as by a diluent/monomer recovery system (e.g., flash vessel or separator vessel, purge column, etc.) to separate the non-polymer components from the polymer fluff. The recovered diluent, unreacted monomer, and other non-polymer components from the recovery system may be treated and recycled to the reactor, for example. As for the recovered polymer (solids), the polymer may be treated to deactivate residual catalyst, remove entrained or dissolved hydrocarbons, dry the polymer, and pelletize the polymer in an extruder, and so forth, before the polymer is sent to customers.

In some circumstances, to increase capacity of a polyolefin polymerization line or to achieve certain desired polymer characteristics, more than one polymerization reactor may be employed, with each reactor having its own set of conditions. In certain examples, the reactors (e.g., loop reactors) may be connected in series, such that the polymer slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymer product is monomodal, bimodal, or multimodal, and having polyolefin portions of different densities, and so on.

The polymerization in a single or multiple reactors is generally exothermic, or heat-generating, and its typically performed in closed systems where pressure can be regulated to control production. As with any such closed system generally, some means should be typically employed to relieve pressure in an overpressure condition of the reactors and associated piping. For loop reactors and other polymerization reactors, pressure relief valves may be employed.

SUMMARY OF THE INVENTION

An aspect of the invention relates to a method of operating a polyolefin manufacturing system, including polymerizing olefin in a first reactor to form a first polyolefin, transferring the first polyolefin to a second reactor, polymerizing olefin in the second reactor to form a second polyolefin, and discharging a product polyolefin from the second reactor, the product polyolefin having the first polyolefin and the second polyolefin. The method includes operating the first reactor with a first reactor pressure relief system and the second reactor with a second reactor pressure relief system, both pressure relief systems configured to discharge to a flare system. The polyolefin manufacturing system includes a relief instrumented system (RIS) to direct at least one process interlock that mitigates an excess reaction scenario of the first reactor or the second reactor, or both, as an overpressure relief scenario.

Another aspect of the invention relates to a method of operating a polyolefin manufacturing system, including: polymerizing olefin in a first reactor form a first polyolefin, the first reactor having a first reactor pressure relief device; transferring the first polyolefin to a second reactor having a second reactor pressure relief device; polymerizing olefin in the second reactor to form a second polyolefin; and discharging a product polyolefin from the second reactor, the product polyolefin has the first polyolefin and the second polyolefin; and wherein the first and second reactor pressure relief devices discharge to a separation system that collects polyolefin solids and discharges vapor to a flare system.

Yet another aspect of the invention relates to a polyolefin production system having: a first reactor to polymerize olefin into a first polyolefin and discharge the first polyolefin to a second reactor; the second reactor to polymerize the olefin into a second polyolefin and discharge a product polyolefin including the first polyolefin and the second polyolefin; a relief instrumented system (RIS) to direct at least one process interlock that mitigates an excess reaction scenario of the first reactor and the second reactor as an overpressure relief scenario; a first pressure relief device disposed on the first reactor and configured to relieve to a flare system, and a second pressure relief device disposed on the second reactor and configured to relieve to the flare system.

Yet another aspect of the invention relates to a polyolefin production system including: a first reactor to polymerize olefin into a first polyolefin and discharge the first polyolefin to a second reactor; the second reactor to polymerize olefin into a second polyolefin and discharge a product polyolefin comprising the first polyolefin and the second polyolefin; a relief instrumented system (RIS) to direct at least one process interlock that mitigates an excess reaction scenario of the first reactor and the second reactor as an overpressure relief demand scenario; a first pressure relief valve disposed on the first reactor and to relieve to a separation system; and a second pressure relief valve disposed on the second reactor and to relieve to the separation system.

BRIEF DESCRIPTION OF THE DRAWINGS

Advantages of the invention may become apparent to one of skill in the art upon reading the following detailed description and upon reference to the drawings in which.

DETAILED DESCRIPTION OF SPECIFIC EMBODIMENTS

Figure 1:
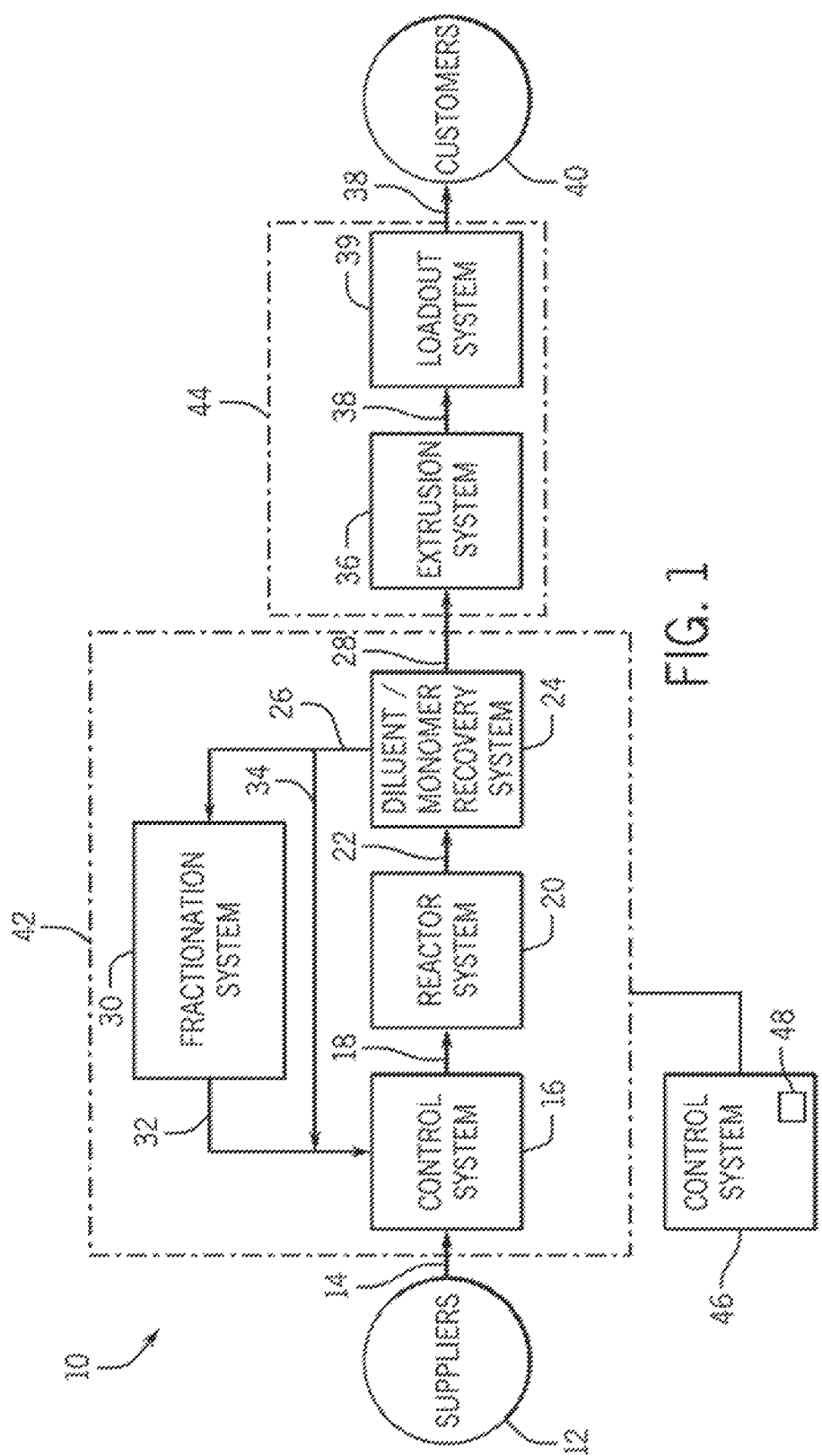
FIG. 1 is a block flow diagram depicting an exemplary polyolefin production system for producing polyolefin in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

The present techniques accommodate the production of the same or different polyolefins in respective polymerization reactors in series. The polyolefin produced in the reactors may be the same or different with respect to polymer density, molecular weight, and so on. To improve such production, the present techniques address pressure control and relief of the multiple polymerization reactors in the reactor system.

As discussed below, the techniques provide for discharge of polymerization reactor relief valves to a flare system. In particular, embodiments route the discharge of the relief valves to a flare header, such as via relief valve discharging piping. Certain embodiments route the discharge of the relief valves through a separation system prior to entry to the flare header. The separation system removes and collects polyolefin solids, and may forward primarily hydrocarbon vapor to the flare header. Further, as also discussed below, embodiments of the present techniques may configure the polymerization reactors and their feed systems such that the feed hydraulic overpressure relief scenario of the reactors is mitigated or avoided. Additionally, a safety instrumented system (SIS) or labeled herein as a relief instrumented system (RIS) provides for process interlocks to mitigate or avoid certain overpressure or relief scenarios, including the runaway or excess reaction overpressure relief scenario.

In general, to achieve desired polymer characteristics in polyolefin production, more than one polymerization reactor may be employed, with each reactor having its own set of conditions. The reactors (e.g., loop reactors) may be connected in series, such that the polymer fluff slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymerized in each respective reactor may have a different molecular weight, different density, and so on. In the case of two reactors in series, two polyolefin polymers (e.g., one polymerized in the first reactor and the other polymerized in the second reactor), each having a different molecular weight fraction or different density, for instance, may be combined into one polymer product discharging from the second (final) reactor.

Thus, in polyolefin production with polymerization reactors in series, the reactors can be operated to produce different polyolefin polymers in each reactor. For example, the olefin monomer may be polymerized in the first reactor to produce a high molecular-weight polyolefin and having a low or high polymer density, and the olefin monomer polymerized in the second reactor to produce a low molecular-weight polyolefin and having a low or high polymer density. On the other hand, the olefin monomer may be polymerized in the first reactor to produce a low molecular-weight polyolefin and having a low or high polymer density, and the olefin monomer polymerized in the second reactor to produce a high molecular-weight polyolefin and having a low or high polymer density. Further, similar molecular weight polyolefin may be produced in each reactor but with the polyolefin density or other properties being different in each reactor.

In a certain examples with two polymerization reactors (e.g., loop reactors) in series, a low molecular-weight high-density polyethylene (LMW HDPE) is produced in one reactor and a high molecular-weight linear low-density polyethylene (HMW LLDPE) produced in the other reactor. Thus, the combined final product is a bimodal polyethylene discharging from the final (second reactor). A chain transfer agent (e.g., hydrogen) is fed to the reactor polymerizing the LMW HDPE to terminate polymer chain growth to facilitate production of the LMW HDPE in the reactor. Therefore, as may be deduced from the foregoing discussion, the pressure control for the reactors may vary.

As an example of polyolefin production having a generally more demanding heat-removal requirement in the second (downstream) reactor as compared to the first reactor, is the polymerization of a low molecular weight high density (LMW-HD) component in the first reactor and a high molecular weight low density (HMW-LD) component in the second reactor. Typically, the LMW-HD component is polymerized (in the first reactor) at a higher temperature (e.g., 230° F.), and the HMW-LD component is polymerized (in the second reactor) at a lower temperature (e.g., 175° F.). As another example, the LMW-HD component may be polymerized in the second reactor and the HMW-LD component may be polymerized in the first reactor.

Lastly, while the present discussion may focus on two reactors in series, the present techniques may be applicable to more than two reactors in series. Further, the techniques may apply to two or more reactors in parallel, or any combinations of series and parallel reactors. Furthermore, various combinations of molecular weights and comonomer additions in monomodal, bimodal, or multimodal polyolefin (e.g., polyethylene, polypropylene, etc.) may be applicable. Moreover, the average molecular weight of the polyolefin polymer (typically polydisperse) is herein generally referred to as "molecular weight," and sometimes as either low molecular weight (LMW) or high molecular weight (HMW) as with grades of polyolefin (e.g., polyethylene). In practice, the average molecular weight of the polyolefin may be the number average, weight average, viscosity average, z average, z+1 average, and other average characterizations.

I. Polyolefin Production Overview

Turning now to the drawings, and referring initially to FIG. 1, a block diagram depicts an exemplary production system 10 for producing polyolefin such as polyethylene, polypropylene, and their copolymers, etc. The exemplary production system 10 is typically a continuous operation but may include both continuous and batch systems. An exemplary nominal capacity for the exemplary production system 10 is about 600-1600 million pounds of polyolefin produced per year. Exemplary hourly design rates are approximately 65,000 to 2000,000 pounds of polymerized/extruded polyolefin per hour. It should be emphasized, however, that the present techniques apply to polyolefin manufacturing processes, including polyethylene production systems, having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and a n-heptane), chain transfer agents (such as hydrogen), catalysts (such as Ziegler-Natta catalysts, chromium catalysts, and metallocene catalysts) which may be heterogeneous, homogenous, supported, unsupported. Feedstocks may include co-catalysts such as, triethylboron, organoaluminum compounds, methyl aluminoxane (MAO), triethylaluminum (TEAl), borates, TiBAl, etc., activators such as solid super acids and other activators. Further, the feedstocks may include antistatic agent (ASA) such as Stadis 450, and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the feed system 16, the feedstocks 14 may be treated or processed prior to their introductions as feed 18 into the polymerization reactor system 20. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be prepared and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams.

In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20. Moreover, a given feed system 16 may be dedicated to a particular reactor or to multiple reactors disposed/operated in series or parallel. Further, a feed system 16 may receive recycle components (e.g., diluent) from one or more downstream processing system.

The reactor system 20 may have one or more reactor vessels, such as liquid-phase or gas-phase reactors. If multiple reactors are employed, the reactors may be arranged in series, in parallel, or in other combinations or configurations. Moreover, multiple reactors arranged and operated in series may be shifted in operation to a parallel or independent operation.

In the polymerization reactor vessels, one or more olefin monomers and optionally comonomers are polymerized to form a product polymer particulates, typically called fluff or granules. In one example, the monomer is ethylene and the comonomer is 1-hexene. In another example, the monomer is propylene and the comonomer is ethylene. Other combinations of monomer and comonomer are possible. The fluff may possess one or more melt, physical, theological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers and comonomers, a catalyst that facilitates polymerization of the ethylene monomer is typically added to the reactor. The catalyst may be a particle suspended in the fluid medium within the reactor. In general, Ziegler catalysts, Ziegler-Natta catalysts, metallocene catalysts, chromium catalysts, nickel catalysts, post-metallocene and other well-known polyolefin catalysts, as well as co-catalysts, may be used. Typically, an olefin-free diluent or mineral oil, for example, is used in the preparation and/or delivery of the catalyst in the feed conduit that taps into the wall of the polymerization reactor. Further, diluent may be fed into the reactor, typically a liquid-phase reactor.

The diluent may be an inert hydrocarbon that is liquid at reaction conditions, such as isobutane, propane, n-butane, n-pentane, i-pentane, neopentane, n-hexane, n-heptane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on. Moreover, in examples of polypropylene production, the propylene monomer itself may act as a diluent.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel that fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor. Lastly, the reactor system 20 typically includes a coolant system to facilitate control of temperature in the polymerization reactors.

The discharge of polyolefin fluff product slurry 22 of the reactors from system 20 may include the polymer polyolefin fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor system (e.g., the final reactor in a series of reactors) through the discharge nozzle may be subsequently processed, such as by a diluent/monomer recovery system 24. The fluff product slurry 22 may also be called a reactor product discharge slurry, a reactor product discharge, or a reactor discharge, etc. Thus, depending on context, a "reactor discharge" may refer to the fluff slurry exiting the reactor and/or to the physical configuration (e.g., reactor wall tap or opening nozzle, conduit, valve if any, etc.) discharging the fluff slurry.

Furthermore, it should be noted that the liquid (e.g., diluent) in fluff product slurry 22 generally partially or fully vaporizes through a flash line including a flash line heater (not shown) downstream of the reactor in route to the diluent/monomer recovery system 24. As discussed below, such vaporization may be due to decreasing pressure through the flash line, and/or due to heat added by the flash line heater (e.g., a conduit with a steam or steam condensate jacket). The diluent/monomer recovery system 24 may process the fluff product slurry 22 (whether the liquid in the slurry 22 is partially or fully vaporized in the flash line) from the reactor system 20 to separate non-polymer components 26 (e.g., diluent and unreacted monomer) from the polymer fluff 28.

A fractionation system 30 may process at least a portion of the untreated recovered non-polymer components 26 (e.g., diluent/monomer) to remove undesirable heavy and light components and to produce olefin-free diluent, for example. Franctionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Of course, in other embodiments, no diluent bypasses the fractionation system 30, or in other words, there is no direct recycle of diluent to the reactors. Moreover, although not illustrated, polymer granules intermediate in the recovery system 24 and typically containing active residual catalyst may be returned to the reactor system 20 for further polymerization, such as in a different type of reactor or under different reaction conditions.

The polyolefin fluff 28 discharging from the diluent/monomer recovery system 24 may be extruded into polyolefin pellets 38 in an extrusion system 36. In the extrusion system 36, the fluff 28 is typically extruded to produce polymer pellets 38 with the desired mechanical, physical, and melt characteristics. An extruder/pelletizer receives the extruder feed including one or more fluff products 28 and whatever additives have been added. Extruder feed may include additives added to the fluff products 28 to impart desired characteristics to the extruded polymer pellets 38. The extruder/pelletizer heats and melts the extruder feed which then may be extruded (e.g., via a twin screw extruder) through a pelletizer die under pressure to form polyolefin pellets 38. Such pellets are typically cooled in a water system disposed at or near the discharge of the pelletizer.

A loadout system 39 may prepare the polyolefin pellets 38 for shipment to customers 40. In general, the polyolefin pellets 38 may be transported from the extrusion system 36 to a product loadout area 39 where the pellets 38 may be stored, blended with other pellets, and/or loaded into railcars, trucks, bags, and so forth, for distribution to customers 40. Polyolefin pellets 38 shipped to customers 40 may include low density polyethylene (LDPE), linear low density polyethylene (LLDPE), medium density polyethylene (MDPE), high density polyethylene (HDPE), enhanced polyethylene, isotactic polypropylene (iPP), sydiotactic polypropylene (sPP), including various copolymers, and so on. The polymerization and diluent recovery portions of the polyolefin production system 10 may be called the "wet" end 42 or alternatively "reaction" side of the process 10. The extrusion 36 and loadout 39 systems of the polyolefin production system 10 may be called the "dry" end 44 or alternatively "finishing" side of the polyolefin process 10. Moreover, while the polyolefin pellets 38 discharging from the extrusion system 36 may be stored and blended in the loadout are 39, the polyolefin pellets 38 are generally not altered by the loadout system 39 prior to being sent to the customer 40.

Polyolefin pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products. To form the end-products or components, the pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin pellets 38 may be further processed and assembled for distribution and sale to the consumer. For example, extruded pipe or film may be packaged for distribution to the customer, or a fuel tank comprising polyethylene may be assembled into an automobile for distribution and sale to the consumer, and so on.

Process variable in the polyolefin production system 10 may be controlled automatically and/or manually via valve configurations, control systems, and so on. In general, a control system (e.g., control system 46), such as a processor-based system, may facilitate management of a range of operations in the polyolefin production system 10, such as those represented in FIG. 1. Polyolefin manufacturing facilities may include a central control room or location, as well as a central control system, such as a distributed control system (DCS) and/or programmable logic controller (PLC). The reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC). Moreover, in the controls systems computer-readable media may store control executable code to be executed by associated processors including central processing units, and the like. Such code executable by the processor may include logic to facilitate the operations described herein.

The DCS and associated control system(s) in the polyolefin production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

The control systems may be wired and/or wireless, and offer the advantage of centralized control, while retaining the capability of distributed or local control. Components may include instrumentation, remote transmitters, remote control panels (e.g., remote transmission units of RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system on the other. Moreover, as indicated, the control system typically includes hardware/software for control, interface, database management, and so on. In operation, the control system may transfer data and commands using communication protocols such as Ethernet or other open standards, or a proprietary standard, depending upon the DCS vendor, for example. Proprietary protocols may require specialized equipment to perform their functions.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

In the illustrated embodiment of FIG. 1, a control system 46 (e.g., DCS) that facilitates control of the polyolefin production system 10 including at least of the wet end 44 is depicted. As indicted above, such a control system 46 may interface with equipment, valves, actuators, instrumentation including sensors and transmitters, and so forth, in the production system 10. Such equipment may include pumps, reactors, vessels, and so on. The control system 46 may include the appropriate hardware (e.g., processor, memory, etc.), software logic including code (e.g., stored on the memory) executable by the processor, to facilitate measurement and control of process variables, to implement control schemes including interlocks, to instruct and set actuator positions and the open/close position of valves, to put equipment in a desired operation state, to start or shut down pumps, and the like.

As indicated, the control system 46 may provide for the implementation of process interlock schemes in the production system 10 to close or open valves, shut down equipment, place equipment in a desired operating state or position, and the like, to prevent or reduce the likelihood of undesirable operating states. Interlocks or interlock schemes may be activated in response to, for instance, an upset condition within the various systems of the production system 10. The control system 46 may include a processor and memory, and with interlock scheme logic stored on the memory and executable by the processor.

The control system 46 may include a relief instrumented system 48 to provide for interlocks that reduce the viability or probability of certain overpressure or relief scenarios, and/or that reduce relief loads during overpressure of the reactors in the reactor system 20, and the like. As discussed in detail below, these interlocks may stop feed pumps, open discharge valves, inject catalyst poison into the reactor to "kill" the polymerization in the reactors, and so forth. Such process interlocks orchestrated via the relief instrumented system 48 may beneficially reduce the actual and design-basis load demand on pressure relief systems for the reactor system 20 and other systems. Such a reduction may advantageously provide for more reliable relief systems, smaller and less expensive relief systems, and so on. The relief instrument system 48 may include or share a processor, memory, and executable logic. Moreover, while the relief instrumented system 48 is depicted as part of the control system 46, the relief instrumented system 48 may be separate or partially separate from the control system 46 in certain embodiments.

The relief instrumented system 48 may take measurements acquired by process sensors disposed throughout the system 10 and performs certain interlock functions based on the measurements by transmitting signals to operate devices (e.g., block valves) in the manufacturing system 10. The relief instrumented system 48 may send and receive signals over a network and other communication mediums, which may include transmission lines and/or wireless features. Additionally, as indicated, the relief instrumented system 48 may be configured to activate a kill system to stop a polymerization, reaction under certain conditions. A reactor kill may include various actions taken to stop a reaction, including isolation of catalyst feed systems, closing of system motor valves, injection of kill fluid into the reactors 50A, 50B (of FIGS. 2 and 3) from kill pots or cylinders, and so forth. It should be noted that block valves to be actuated by the relief instrumented system 48 may include position indication features that provide verification of whether the valve operated properly.

II. Polymerization Reactor System

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type includes reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene or polypropylene, is discussed in the present context though it is to be understood that the present techniques may be similarly applicable to other types of liquid phase reactors.

Figure 2:
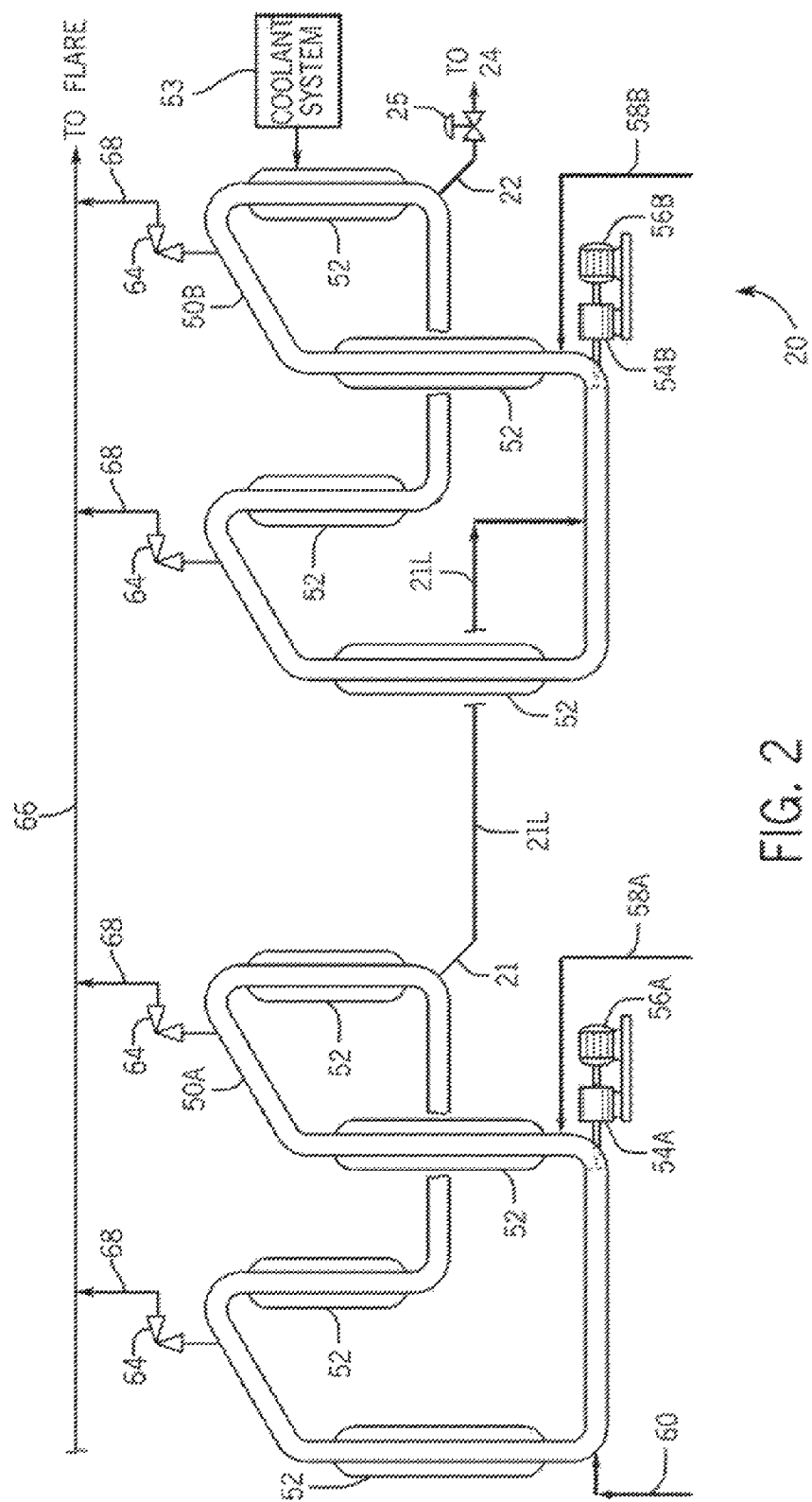
FIG. 2 is a process flow diagram of an exemplary reactor system of the polyolefin production system of FIG. 1 in accordance with embodiments of the present techniques.

FIG. 2 depicts an exemplary polymerization reactor system 20 (of FIG. 1) as having two loop slurry (polymerization) reactors 50A, 50B disposed and operated in series. Additional loop reactors or other reactors (e.g., autoclave reactors, gas phase reactors, etc.) may be disposed in series or parallel in the illustrated combination. Moreover, in embodiments, the reactors 50A, 50B may be shifted to a parallel operation. The present techniques contemplate aspects of a variety of reactor system configurations such as those also disclosed in U.S. Patent Application Publication No. 2011/0288247 which is incorporated by reference herein in its entirety.

Processing equipment (not shown) may be disposed between the two loop reactors 50A, 50B, and so on. The processing equipment disposed between the reactors 50A, 50B, if so disposed, may remove diluent, solids, light components, ethane, hydrogen, and so forth, from the transfer slurry 21 for recycle to the first reactor 50A and/or to a recovery system, and the like. In one example, this processing equipment disposed between the serial reactors 50A, 50B includes a hydrocyclone. This processing disposed between the reactors may also have capability to remove heat from and lower the temperature of the transfer slurry discharging from the first reactor to the second reactor.

A loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs approximately 24 nominal inches in diameter and approximately 200 feet in length, connected by pipe elbows at the top and bottom of the legs. Although those dimensions are used for purposes of this example, the diameters of the pipes may generally be in the range of 18 inches and 30 inches, for example, and the lengths of the legs can vary greatly, depending on numerous factors including the ratio of horizontal to vertical distances designed into the reactor configuration. FIG. 2 shows a four leg segment reactor arranged vertically. It could also be arranged horizontally.

The reactor jackets 52 are normally provided to remove heat from the exothermic polymerization via circulation of a cooling medium or coolants, such as treated water, through the reactor jackets 52. In the illustrated embodiment, a coolant system 53 provides coolant supply 55 to the reactor jackets 52. The coolant system 53 may receive a coolant return (not shown) from the reactor jackets 52.

As discussed above in certain examples for a polyolefin reactor, the inlet coolant temperature, the minimum or low coolant temperature, or the coolant supply 55 temperature to the reactor jackets 52 may be 100° F., 105° F., 110° F., 115° F., 120° F., and so on. The coolant ΔT or increase in the temperature of the coolant through the reactor jackets 52 may be 5° F., 7° F., 10° F., 15° F., 20° F., 25° F., 30° F., 40° F., 50° F., and so forth. The reactor temperature control system including the reactor coolant system 53 may be designed such that the temperature of the coolant return exiting the final jacket 52 of the reactor returning to the coolant system 53 does not exceed 170° F., for example. The design (including the coolant flow rate, for instance) may provide for a maximum or high coolant ΔT through the jackets 52 of 15° F., 25° F., 40° F., and the like.

The reactors 50A, 50B may be used to carry out polyolefin (e.g., polyethylene, polypropylene) polymerization under slurry conditions in which insoluble particles of polyolefin are formed in a fluid medium and are suspended as slurry until removed. A respective motive device, such as pump 54A, 54B, circulates the fluid slurry in each reactor 50A, 50B. An example of a pump 54A, 54B is in-line axial flow pump with the pump with impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

The fluid medium within each reactor 50A, 50B may include olefin monomers and comonomers, diluent, co-catalysts (e.g., alkyls, triethylboron, TiBAL, TEAl, methyl aluminoxane or MAO, borates, TEB, etc.), activator supports like solid super acids, molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position in certain embodiments. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, n-heptane, cyclohexane, cyclopentane, methylcyclopentane, ethylcyclohexane, and the like. These components are added to the reactor interior via inlets or conduits at specific locations, such as depicted at feed streams 58A, 58B, which generally corresponds to one of the feed streams 18 of FIG. 1.

Likewise, a catalyst, such as those previously discussed, may be added to the reactor 50A via a conduit at a suitable location, such as depicted at feed stream 60, which may include a diluent carrier and which also generally corresponds to one of the feed streams 18 of FIG. 1. again, the conduits that feed the various components tie-in (i.e., flange or weld) to the reactor 50. In the illustrated embodiment, catalyst feed 60 is added to the first reactor 50A in series but not to the second reactor 50B. However, active catalyst may discharge in a fluff slurry 21 from the first reactor 50A to the second reactor 50B. Moreover, while not depicted, a fresh catalyst may be added to the second reactor 50B in certain embodiments. In total, the added components including the catalyst and other feed components generally compose a fluid medium within the reactor 50A, 50B in which the catalyst is a suspended particle.

The reaction conditions, such as temperature, pressure, and reactant concentrations, in each reactor 50A, 50B may be regulated via a reactor controller or control system 46 (FIG. 1) such as a DCS to facilitate the desired properties and production rate of the polyolefin in the reactors 50A, 50B, to control stability of the reactors 50A, 50B, and the like. This control may be achieved by linking various sensors and control devices to a control system (e.g., control system 46) for reactor control.

Temperature is typically maintained below that level at which the polymer product would significantly go into solution, swell, soften, or become sticky. As indicated, due to the exothermic nature of the polymerization reaction, a cooling fluid or coolant may be circulated through jackets 52 around portions of the loop slurry reactor 50A, 50B to remove excess heat, thereby maintaining the temperature within the desired range, generally between 150° F. to 250° F. (65° C. to 121° C.). Likewise, pressure in each loop reactor 50A, 50B may be regulated within a desired pressure range, generally 100 to 800 psig, with a range of 450 to 700 psig being typical. Of course, the reactor/pressure control and relief techniques disclosed herein may be applicable to lower-pressure polyolefin processes, such as those with reactors operating in a typical range of 50 psig to 100 psig, and with hexane as a common diluent, for example.

As the polymerization reaction proceeds within each reactor 50A, 50B, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 50A, 50B via a reactor discharge. In the illustrated embodiment of FIG. 2, a transfer slurry 21 is discharged from the first reactor 50A, and a product slurry 22 is discharged from the second reactor 50B.

For the transfer slurry 21 and product slurry 22, respectively, each reactor discharge may be (1) an intermittent discharge such as a settling leg, pulsating on/off valve, and so on, or (2) a continuous discharge such as continuous take-off (CTO) which optionally has a modulating valve, or the like. Further, the discharges may be subjecting to processing (not illustrated) such as pumping (e.g., via centrifugal pump), heating, cooling, evaporative cooling, separation such as with a hydrocyclone or other separation device/vessel, or other similar processing.

As for a continuous discharge, a variety of discharge configurations are contemplated. For instance, employment of an isolation valve (e.g., full-bore Ram valve) without an accompanying modulating valve may provide for continuous discharge of slurry from the loop reactor. Further, a CTO may be defined as having at least a modulating flow valve, and provide for a continuous discharge of slurry from the loop reactor. In certain examples, a CTO is further defined as a continuous discharge having a modulating valve (e.g., v-ball valve) on the discharge conduit at the reactor and an isolation valve (e.g., Ram valve) at the reactor wall. It should be noted that a Ram valve in a closed position may beneficially provide a surface that is flush with the inner wall of the reactor to preclude the presence of a cavity, space, or void for polymer to collect when the Ram valve is in the closed position.

As for a continuous discharge of the transfer slurry 21 from the first reactor 50A, a continuous discharge on the first reactor may be a CTO (not shown), or may be a continuous discharge (as shown) without a modulating valve (but with an isolation valve, for example), and so on. Moreover, the reactors could be run at the same or different pressures. The continuous transfer without a modulating valve could better take advantage of the pressure drop in the reactor for the driving force for transfer. The available motive force for transfer of a discharge slurry 21 may be considered as the pressure drop (i.e., from the discharge of the pump 54A to the suction of the pump 54B) through the first reactor 50A.

The pressure differential between the discharge of the first loop reactor pump 54A and the suction of the second loop reactor pump 54B may provide a motive force for the transfer of transfer slurry 21 from the first loop reactor 50A to the second loop reactor 50B. The pump suction, whether of the first pump 54A or second pump 54B, may be considered upstream of the pump (from the pump inlet) in pipe length of the respective loop in the range of up to about 0.5 meter to 50 meters (e.g., 0.5, 1, 5, 15, 25, 50 meters, or values in between). Similarly, the pump discharge may be considered a pipe length from the pump outlet up to about 0.5 meter to 50 meters (e.g., 0.5, 1, 5, 15, 25, 50 meters, or values in between), as well as up to 100 meters, and more. The actual motive force realized for the transfer slurry 21 may depend on the location of the first reactor 50A discharge into the transfer line 21L (relative to the pump 54A) and the location on the second loop reactor 50B (relative to the pump 54B) of the other end of the transfer line 21L (i.e., the discharge end of transfer line 21L). The location for the transfer line 21L relative to the pumps 54A and 54B may be selected to give adequate motive force (delta P) for flow of the transfer slurry 21 through the transfer line 21L, i.e., to overcome the hydraulic resistance or pressure losses (drop) through the transfer line 21L (as well as through any additional processing equipment such as a hydrocyclone, evaporation cooler, etc.) to the second reactor 50B. Moreover, in certain embodiments, a pump (not shown) may further provide motive force and facilitate movement of the transfer slurry 21 to the second reactor 50B.

Again, in certain examples, the two loop reactors 50A, 50B may be operated in series and such that the polyolefin fluff in the fluff slurry 22 discharging from the second reactor 50B (also referred to as product polyolefin) is monomodal or bimodal. In certain cases of monomodal production, the reactor operating conditions may be set such that essentially the same polyolefin or similar polyolefin is polymerized in each reactor 50A, 50B. On the other hand, in monomodal production in terms of molecular weight, the conditions in the reactor may be the same or similar such as with regard to hydrogen concentration but different in terms of comonomer concentration, for example, so to produce polyolefin with similar molecular weight (i.e., monomodal) but different polymer density in each reactor.

In the case of bimodal production, the reactor operating conditions may be set such that the polyolefin polymerized in the first reactor 50A is different than the polyolefin polymerized in the second reactor 50B. Thus, with two reactors, a first polyolefin produced in the first loop reactor 50A and the second polyolefin produced in the second loop reactor 50B may combine to give a bimodal polyolefin or a monomodal polyolefin. Further, again, whether monomodal or bimodal, i.e., in terms of molecular weight, the first polyolefin produced in the first loop reactor 50A and the second polyolefin produced in the second loop reactor 50B may have different polymer densities, for example.

Operation of the two loop reactors 50A, 50B may include feeding more comonomer to the first polymerization reactor than to the second polymerization rector, or vice versa. The operation may also include feeding more chain transfer agent (e.g., hydrogen) to the second polymerization reactor than the second reactor, or vice versa. Of course, the same amount of comonomer and/or the same amount of chain transfer agent (e.g., hydrogen) may be fed to each reactor 50A, 50B. Further, the same or different comonomer concentration may be maintained in each reactor 50A, 50B. Likewise, the same or different chain transfer agent (e.g., hydrogen) concentration may be maintained in each reactor 50A, 50B.

Furthermore, the first polyolefin (i.e., polyolefin polymerized in the first reactor 50A) may have a first range for a physical property, and the second polyolefin (i.e., polyolefin polymerized in the second reactor 50B) may have a second range for the physical property. The first range and the second range may be the same or different. Exemplary physical properties may include polyolefin density, comonomer percentage, short chain branching amount, molecular weight, viscosity, melt index, melt flow rate, crystallinity, and the like.

As indicated, the polyolefin product fluff slurry 22 discharges from the second reactor 50B and is subjected to downstream processing, such as in a diluent/monomer recovery system 24. As mentioned, the product fluff slurry 22 may discharge through a settling leg, a continuous take-off (CTO), or other valve configurations. Indeed, the product fluff slurry 22 may discharge intermittently such as through a settling leg configuration or pulsating on/off valve, or instead may discharge continuously such as through a CTO. In the illustrated embodiment of FIG. 2, a CTO having a modulating valve 25 is employed for the product fluff slurry 22 discharging from the second reactor 50B.

In operation, depending on the positioning, for example, of the discharge on the second reactor, a discharge slurry 22 having a greater solids concentration than average solids concentration of the slurry circulating in the reactor 50B may be realized with continuous discharge. Again, a continuous discharge may include a discharge configuration having an isolation valve (Ram valve) alone, or having a CTO configuration with an isolation valve (Ram valve) and modulating valve 25. Exemplary CTO configurations and control, and other discharge configurations, may be found in the aforementioned U.S. Patent Application Publication No. 2011/0288247, and in U.S. Pat. No. 6,239,235 which is also incorporated herein by reference in its entirety.

As mentioned, in the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit.

In the embodiment of FIG. 2, a transfer fluff slurry 21 discharges from the first loop reactor 50A to the second loop reactor 50B via a transfer line 21L. The contents of transfer fluff slurry 21 may be representative of the contents of the first loop reactor 50A. However, the solids concentration may be greater in the transfer slurry 21 than in the first loop reactor 50A, depending on the positioning of the inlet of the transfer line 21L on the first loop reactor 50A, for example, and other considerations. The transfer fluff slurry 21 may discharge from the first loop reactor 50A into the transfer line 21L through a settling leg, an isolation valve (e.g., a Ram valve), a continuous take-off CTO (which as indicated the CTO has both an isolation Ram valve and a modulating valve), or other valve configuration.

In the illustrated embodiment, the discharge of the transfer slurry 21 from the first loop reactor 50A is continuous and not directly modulated. A CTO or settling leg is not employed. Instead, the transfer slurry 21 discharges through an open isolation valve (e.g., Ram valve) (not shown) at the reactor wall and without a modulating valve on the transfer line 21L in this example. In a particular example, the transfer slurry 21 discharges through a full-bore Ram valve maintained in a full-open position, and not additionally through a modulating valve. The continuous transfer of slurry 21 through the transfer line 21L from the first reactor 50A to the second reactor 50B can be controlled by the pressure differential between the reactors 50A, 50B, and not require a modulating valve.

In alternate embodiments (not illustrated), a modulating valve may be disposed on the transfer line 21L, or a CTO with its modulating valve may be situated at the transfer slurry 21 discharge of the first reactor 50A. If so included, the modulating valve may control flow rate of the transfer slurry 21 and facilitate control of pressure in the first loop reactor 50A. Moreover, a modulating valve or a CTO and its modulating valve may be disposed to facilitate control of the first reactor 50A discharge when the two reactors 50A, 50B are shifted in operation from serial to parallel performance, for instance.

Nevertheless, in the various embodiments, an isolation (e.g., Ram) valve is typically disposed on the discharge at the wall of the first loop reactor 50A. The Ram valve may provide for isolation of the transfer line 21L from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50A, 50B during maintenance or downtime of the reactor system 20, or when an alternate discharge or transfer line from the first reactor 50A is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

In the illustrated embodiment, control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure elements or instruments may be disposed on the reactors 50A, 50B and on the transfer line 21L. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and similar elements, of which may be housed in a thermowell, for instance. Transmitters may convert a received analog signal from the sensing element to a digital signal for feed or transmission to a control system, for example. The various instruments may have local indication of the sense variable. For instance, a pressure element or instrument may be or have a local pressure gauge and a temperature element or instrument may be or have a local temperature gauge, both of which may be read locally by an operator or engineer.

The inlet position of the transfer line 21L may be located on the first loop reactor 50A on the discharge side of the circulation pump 54A in the first loop reactor 50A. The outlet position of the transfer line 21L may couple to the second loop reactor on the suction side of the circulation pump 54B in the second loop reactor 50B. Such a configuration may provide a positive pressure differential (i.e., a driving force) for the flow of transfer slurry 21 through the transfer line 21L from the first loop reactor 50A to the second loop reactor 50B. In one example, a typical pressure differential (provided from the discharge of the first pump 54A to the suction of the second pump 54B) is about 20 pounds per square inch (psi). Again, the pump suction side, whether of the first pump 54A or second pump 54B, may be considered upstream of the pump in linear loop pipe length in the range of about 0.5 meter to 50 meters (e.g., 0.5, 1, 5, 15, 25, 50 meters, or values therebetween). Similarly, the pump discharge side may be considered downstream of the pump in linear loop pipe length of about 0.5 meter to 50 meters (e.g., 0.5, 1, 5, 15, 25, 50 meters, or values therebetween), and up to about 100 meters, and so on.

It should be noted that in certain embodiments, the first reactor 50A and the second reactor 50B may have a first to second reactor capacity ratio of between 0.5:1 to 1.5:1. In other words, the polyolefin production ratio between the two reactors may be varied from 0.5 to 1.5 as theoretical or practical limits in certain examples. In some instances, the lower 0.5 indicates the turn down capability and the upper 1.5 may be an upper design limit. In other embodiments, the polyolefin production ratio is in the range of 0.5 to 1.3. Moreover, the first reactor and the second reactor may be substantially the same size in volume, or differ in size by volume. In certain examples, the first reactor is 50% to 90% in size by volume of the second reactor. In other examples, the second reactor is 50% to 90% in size by volume (or capacity) of the first reactor.

III. Pressure Relief for the Polymerization Reactor System

The present techniques provide one or more pressure relief systems such as one or more pressure relief valves 64 on the reactors 50A, 50B that discharge to a flare system. This is in contrast to conventional systems in which pressure relief valves on the polyolefin reactors discharge to atmosphere (the environment).

A polymerization reactor 50A, 50B may have multiple pressure relief systems each pressure relief system including or being a pressure safety device (PDS) such as a pressure relief device. Examples of a pressure relief device include a pressure safety valve (PSV), a pressure relief valve (PRV) 64, a rupture disk, and the like. An individual pressure relief system disposed on a polyolefin polymerization reactor may be a singular pressure relief device. On the other hand, an individual pressure relief system disposed on a polyolefin polymerization reactor may have more than one pressure relief device. In embodiments, a pressure relief system may be a combination of a PRV 64 with a rupture disk installed between the PRV 64 and the reactor. Also, a pressure relief system may be two or more pressure relief devices disposed in parallel, for example.

A reactor pressure relief system on a reactor opens in response to a reactor pressure exceeding a set pressure(s) of the pressure relief system or pressure relief device. For instance, a rupture disk may rupture when the reactor pressure reaches or exceeds the set pressure of the rupture disk. Likewise, a PRV 64 may open when the reactor pressure reaches or exceed the set pressure of the PRV 64.

In the illustrated embodiment of FIG. 2, the pressure relief valves 64 discharge to a flare header 66 of the flare system. The discharge of the pressure relief valves (PRVs) 64 is routed to (coupled to) to the flare header 66 via respective relief discharge piping 68. The flare header 66 may be a primary or main header of the flare system, a subheader in the flare system, and the like. The flare header 66 may be a main or primary header routed through the facility of the system 10 configured to collect relief discharges from various relief valves and rupture disks, and so on, throughout the site. On the other hand, the flare header 66 may be a more localized subheader to collect relief discharges in the immediate area. Lastly, while respective discharge piping 68 segments are depicted from the PRVs 64 and routed separately to the flare header 66, other configurations are contemplated such as combining or merging the discharge piping 68 segments in a subheader prior to entry to the flare header 66.

The contents in the flare headers, including flare header 66, may typically be routed to and through a downstream flare knock-out pot or vessel (not shown) prior to reaching the flare for combustion. The flare knock-out pot collects solids (e.g., polyolefin) and liquid while discharging vapor (e.g., diluent, monomer, and other hydrocarbons) to the flare for combustion. The techniques accommodate retrofit of an existing reactor system 20 to couple PRVs 64 to an existing flare system or flare header 66, as well as in grassroots or new construction of a reactor system 20 and flare system. In alternate embodiments, the PRVs 64 may discharge to a recovery system or another combustion system in lieu the flare header 66 or flare system.

While four PRVs 64 (two per reactor 50A, 50B) are depicted in FIG. 2, more or less than four PRVs 64 may be employed. For a loop reactor 50A, 50B having more vertical leg segments (e.g., 8 or 16 per reactor) than the four per reactor depicted (and thus having more than the two upper horizontal segments per reactor), more PRVs 64 per reactor 50A, 50B may be employed. As appreciated by the skilled artisan, the pressure relief valves 64 (PRVs 64), which may also be labeled pressure safety valves (PSVs). The PRV's 64 may be a valve mechanism that automatically releases a substance or contents from a pressure vessel (loop reactors 50A, 50B) when the pressure (reactor pressure) at the PRV 64 exceeds preset limits (i.e., exceeds the set pressure of the PRV 64).

In addition, a rupture disk (not shown) may be installed on the inlet piping to a PRV 64 between the reactor 50A, 50B and the PRV 64. The rupture disk may be a flush-mounted or "Top Hat" rupture disk design, for example. In such designs, an extended rupture disk holder may be mounted in the relief nozzle on the reactor 50A, 50B to bring the rupture disk physically close or flush with the reactor 50A, 50B well. During normal operation of the reactor system 20, the rupture disk may help prevent or reduce the reactor 50A, 50B contents (slurry) from entering and fouling the PRV 64 and its inlet piping. In an upset condition of the reactor system 20 with an overpressure of the reactor 50A, 50B, the rupture disk bursts facilitating pressure relief of the reactor 50A, 50B contents to and through the PRV 64. The set pressure of the rupture disk may be specified at a pressure slightly less than the set pressure of the corresponding PRV 64, for example.

In a specific example for a reactor 50A, 50B, the relief nozzles on the reactor 50A, 50B are 8 inch, the rupture disk is 6 inch, and PRV 64 is a 4 inch×6 inch pressure relief valve set at 950 psig or 900 psig. The inlet piping may include an 8 inch×4 inch reducer, for instance. The discharge piping 68 may include a car-sealed open (CSO) valve, a 6 inch×10 inch reduce to increase the size of the discharging piping to 10 inch, for instance, to the flare header 66 which in this specific example may generally be 12 inch or significantly larger. These components are coupled together to provide a relief path from the reactor 50A, 50B to the flare.

The inlet piping spool to a PRV 64 may be constructed shorter in length to reduce relief inlet pressure drop. Similarly, the discharge piping may be constructed shorter where possible. Such a shorter length of discharge piping 68 may beneficially provide for lower hydraulic backpressure on the PRV 64 when relieving.

In one embodiment, the depicted relief systems may be placed on a top portion of the legs of a loop reactor 50A, 50B, wherein a PRV 64 is set at 950 psig for certain legs, and a PRV 64 is set at 900 psig for other legs. Again, the rupture disk may function to isolate the PRV 64 from reactor 50A, 50B contents while avoiding a buildup of solids. Indeed, such a design may prevent or reduce accumulation of solids in the nozzles of the PRVs 64 prior to activation of the PRVs 64 in a pressure relief scenario.

The PRVs 64 illustrated in FIG. 2 may be representative of multiple staged relief valves in a relief system. For example, the PRVs 64 may include multiple different relief valves that are staged from the top of each pair of reactor legs per reactor 50A, 50B (e.g., on top of legs or bends of loop reactors 50A, 50B). Indeed, the PRVs 64 corresponding to each pair of reactor legs per reactor 50A, 50B may include a first PRV configured to open at the maximum allowable working pressure (MAWP) of the reactor 50A, 50B and a second PRV configured to open at 5% above the MAWP of the reactor 50A, 50B. In one embodiment, the PRVs between each reactor leg for a given reactor 50A, 50B may have alternating relief set points. For example, a relief valve positioned between a first pair of reactor legs may have a different relief set point than that of the two adjacent relief valves between adjacent leg pairs. Placement of the PRVs 64 at the top of each reactor 50A, 50B may be beneficial in the event of a loss of reactor circulation and may avoid plugging. Moreover, a given PRV 64 may include two or more parallel PRVs.

Figure 3:
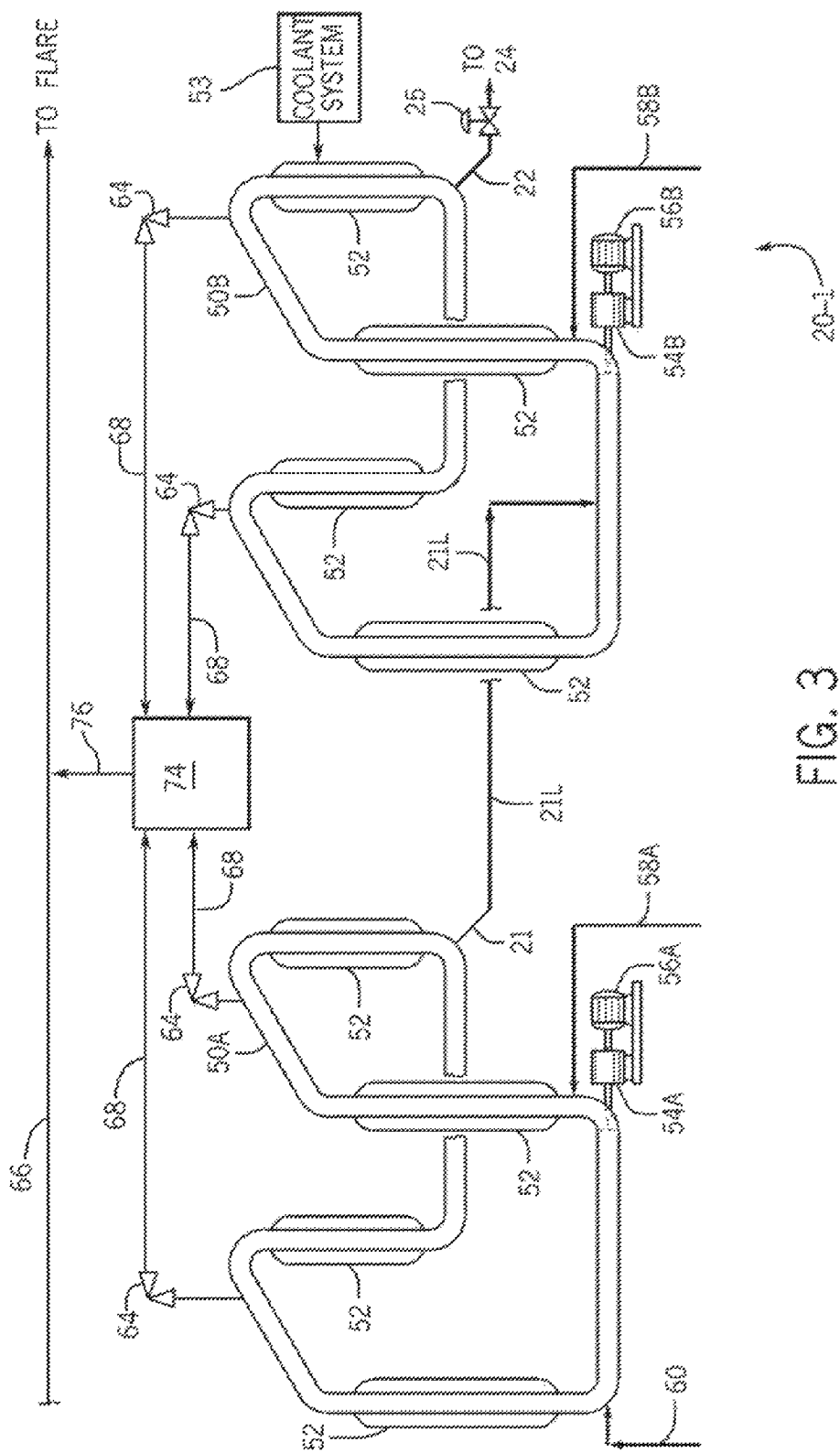
FIG. 3 is a process flow diagram of an exemplary reactor system of the polyolefin production system of FIG. 1 in accordance with alternate embodiments of the present techniques.

FIG. 3 is an alternate embodiment of a reactor system 20-1 having the features discussed above with respect to FIG. 2, except that the PRVs 64 discharge to a separation system 74. As discussed below, the separation system 74 may be a cyclone, a vessel (separator, knockout pot or drum, collection vessel, accumulator, etc.), or a combination of a cyclone and a vessel, and the like. The separation system 74 may separate solid and liquid components from vapor or gas components and transmit the vapor or gas components to a flare through the flare header 66.

The PRV discharge piping 68 in FIG. 3 routes the respective relief discharge streams from the PRVs 64 to the separation system 74. While the four respective discharge piping 68 segments are shown separately entering the separation system 74, other configurations of the piping 68 are contemplated, such as combining or merging the two or more of the discharge piping 68 segments prior to entry into the separation system 74.

The separation system 74 receives the contents of the reactors 50A, 50B discharging (relieving) through the PRVs 64 during a reactor 50A, 50B overpressure scenario. As indicated, the separation system 74 collects solids, such as polyolefin solids in the slurry from the reactors 50A, 50B flowing through the PRVs 64 and discharge piping 68. The separation system 74 typically operates at a lower pressure than normal pressures in the reactors 50A, 50B such that most of the liquid entering the separation system 74 may vaporize in certain embodiments. The separation system 74 discharges vapor 76 (e.g., diluent, monomer, comonomer, etc.) and any entrained solids to the flare header 66. This vapor 76 flows through the flare header 66, and is sent to and combusted in a flare of the flare system. The solids (e.g., polyolefin fluff) and any liquid collected in the separation system 74 may ultimately be recovered (not shown) as scrap material or disposed as waste, and so forth. The components on the discharge of the PRVs 64 and in the separation system may be sized to reduce backpressure on the PRVs 64 during a relieving event.

As indicated, the separation system 74 may include a vessel that receives the relief slurry discharging from the PRVs 64. The vessel may collect solids and any liquid in the entering slurry via settling of the solids and liquid to a lower portion of the vessel. Vapor 76 may discharge from an upper portion of the vessel to the flare header 66. In operation after the conclusion of a relief scenario, the vessel may eventually be emptied of the solids (and any liquid not flashed or vaporized) that were collected. The vessel may be sized to hold the amount of solids (and liquid) that flows through the relief valves 64 for various overpressure relief scenarios of the reactors 50A, 50B including the viable worst-case scenario for the predicted greatest amount of solids (and liquid). The vessel may be a vertical or horizontal vessel, a collection vessel or drum, a knockout pot similar to a flare knockout pot, and so forth. Moreover, the vessel may be a vessel employed for other operations. For instance, the separation system 74 vessel may be a flash vessel in the downstream diluent/diluent recovery system 24 that processes the product polyolefin slurry discharge 22 from the reactor system 20. In general, the one or more vessels in the separation system 74 for receiving the PRV 64 discharges can be the flash vessel, a reactor thump tank, alternate flash tank, flare knockout pot, a vessel in the fractionation system 30, and so on.

In some embodiments, the separation system 74 may include a cyclone that receives from the discharge piping 68 the relief slurry discharging from the PRVs 64. This vaporizing slurry from the reactors 50A, 50B generally enters a side nozzle of the cyclone. Vapor 76 may discharge overhead from the cyclone and enter the flare header 66 for eventual combustion in the flare. Solids may discharge from the bottom of cyclone and be collected in an accumulator, for instance, for eventual recovery as scrap material or disposal as waste.

Lastly, it should be noted that with respect to FIGS. 1-3 and bases for sizing of the PRVs 64, discharge piping 68, flare header 66, separation system 74 (if employed), and flare system, certain industry standards such as with the American Petroleum Institute (API) and the American National Standard Institute (ANSI), may be employed to evaluate and facilitate calculations of relieving flow rates from the reactors 50A, 50B during potential overpressure relief scenarios. Whatever the relieving scenario(s) selected or specified as governing for relief demand sizing (i.e., that gives the viable greatest flow rate of relieving slurry from the reactors 50A, 50B through the PRVs 64), dynamic modeling or programs may be used to evaluate or design the relief scenarios for certain reaction conditions, sizing the flare header 66, and the line sizes to assure that sufficient line velocity is in place to transport solids during a relief event. Such program may account for the dynamic expansion of the liquid and solids in the reactor as heat and mass are added and removed.

The discussion now turns to the elimination or mitigation of reactor 50A, 50B relief scenarios with respect to FIGS. 1-3 and other embodiments. As discussed below, the aforementioned relief instrumented system (RIS) 48 (FIG. 1) is configured in certain embodiments to eliminate a runaway or excess reaction scenario for the reactors 50A, 50B as a relief scenario. In particular, the RIS 48, as an engineered control system, is configured to institute process interlocks that prevent or mitigate the excess reaction scenario by (1) activating the kill injection (e.g., injection of a catalyst poison or inhibitor) for reactor 50A, 50B temperature deviations above set point; and (2) isolating the reactors 50A, 50B from diluent (and monomer) feed 58A, 58B, and catalyst feed 60 at high reactor 50A, 50B pressure, and the like.

Further, as also discussed below, an operation and design hydraulic limitation related to the reactors 50A, 50B and reactor feeds, including reactor feed pumps (e.g., centrifugal pumps), eliminates or mitigates the feed hydraulic overpressure scenario for the reactors 50A, 50B as a relief scenario. In particular, for example, the hydraulic overpressure relief can be eliminated by limiting the feeds, supply pressure to below the maximum allowable working pressure (MAWP) of the reactors 50A, 50B. As indicated below, such may be implemented, for example, with the design of feed pumps and reactors 50A, 50B, and/or by controlling reactor feed pressures, and the like.

In general and referencing FIGS. 1-3, for various possible relief demands from a reactor system 20 and its polyolefin loop reactors 50A, 50B, the excess reaction relief scenario and the feed hydraulic overpressure relief scenario could each impact the sizing of the relief system. The exothermic excess reaction scenario may involve, for instance, excess reaction, lack of cooling, and blocked reactor 50A, 50B outlets. In this excess reaction scenario, the contents in the reactors 50A, 50B expand and may cause a relief through the reactor PRV's 64. However, as indicated, embodiments of the present techniques provide a RIS 48 which gives interlocks to mitigate or avoid the excess reaction scenario and thus eliminate this excess reaction scenario as a relief scenario.

In such an excess reaction scenario with high reactor rates, loss of cooling, and closed/plugged reactor outlets, the reactor 50A, 50B pressure is increased. For polyethylene production using isobutane as diluent, since the PRV's 64 set point may be above the isobutane mixture critical pressure, the reactors 50A, 50B would be relieved under supercritical condition. There would generally be no evaporative cooling as the reactor 50A, 50B contents remain either as liquid or dense supercritical fluid. The temperature and pressure in reactor 50A, 50B would continue to rise until the reaction slows and stops from depletion of monomer. This excess reaction scenario may be avoided as a relief scenario via implementation of interlocks by the RIS 48.

In particular, the RIS 48, as an engineered control system, is configured to institute interlocks that prevent at least the excess reaction scenario (and the associated potential fouling through the PRVs 64) by activating the kill injection (e.g., injection of a catalyst poison or inhibitor) for reactor temperature deviations above set point and isolating the reactors 50A, 50B from feed at high reactor 50A, 50B pressure. Catalyst poisons used for kill injection into the reactors 50A, 50B may include, for example, water, oxygen, carbon monoxide, carbon dioxide, and organic compounds containing sulfur, oxygen, or halogens, and other catalyst poisons or inhibitors, i.e. that inhibit or significantly reduce catalyst activity and the polymerization reaction.

As mentioned, the present techniques may also mitigate a feed hydraulic overpressure scenario where the reactors 50A, 50B become over pressured by one or more of the reactor feeds (e.g., 18, 58A, 58B). Hydraulic overpressure relief may typically occur when the reactor 50A, 50B discharge systems are not functioning properly. In such an event, the reactor feeds may be delivered at a pressure higher than the pressure setting of the PRVs 64 and result in lifting of one or more of the PRVs 64.

However, in accordance with present embodiments, the maximum allowed working pressure (MAWP) of the reactors 50A, 50B may be higher than the maximum pressure of the feed system 16 (FIG. 1). This eliminates or reduces the likelihood and/or load of certain pressure relief scenarios where the feed system 16 can cause a relief scenario in the reactors 50A, 50B by its supply pressure. Beneficially, the reactor feed pumps (e.g., centrifugal pumps) may be configured such that the maximum delivered pressure of the feed (e.g., 18, 58A, 58B) to the reactors 50A, 50B is less than the MAWP of the reactors 50A, 50B. Further, the reactors 50A, 50B may be constructed with greater MAWP, such as by providing for increased thickness, and/or constructed with rolled plate instead of seamless pipe, for example. Thus, the reactor feed system 16 may be designed to deliver feed (e.g., diluent, monomer, comonomer, etc.) at lower pressure than the set pressure (generally a function of the reactor MAWP for relief PRVs 64 of the reactors 50A, 50B after accounting for static head differences between the reactor relief point and the reactor feed point. Hydraulic relief scenarios become less probable at higher reactor pressure ratings when feed systems are limited.

As an example, a recycle diluent (e.g., isobutane) feed system for the reactors 50A, 50B may be designed in accordance with present embodiments such that the maximum head of a recycle diluent pump at block-in condition does not exceed a reactor relief valve reseat pressure setting after accounting for static pressure difference between the elevation of the pump discharge and the reactor relief valve. Determination of the potential maximum discharge pressure should typically take into account a suction pressure of the recycle diluent pump at normal operating pressure on the recycle diluent surge vessel plus static head pressure at a normal level of the surge vessel. For example, if the reactor's relief valve reseat pressure is 840 psig at 213 feet higher than the recycle diluent pump, the discharge pressure of the recycle diluent pump should be less than 890 psig, allowing for reactors 50A, 50B content slurry specific gravity of 0.54. Based on such a design and corresponding operation, the recycle diluent pump will generally not cause a reactor relief event for single failure scenarios.

In sum, certain design and operating implementations (such as with mitigating the feed hydraulic overpressure scenario), and the aforementioned relief instrumented system 48 (FIG. 1) which provides for particular interlocks (e.g., to eliminate the excess reaction scenario as a basis for a relief scenario), and so on, may reduce the likelihood of particular overpressure relief scenarios or render particular overpressure relief scenarios not viable, and/or reduce the worst-case relief load to be experienced. Therefore, in reference to FIGS. 2 and 3, the PRVs 64 and associated piping (including the discharge piping 68), the separation system 74 (if employed), the flare header 66, flare knockout pot, flare, and so on, may be beneficially designed or maintained at relatively smaller and less expensive sizing. Moreover, such design and operating implementations, and the aforementioned relief instrumented system 48 (FIG. 1) may beneficially increase reactor system 20 stability and more effective mitigation of reactor system upset or overpressure conditions.

Therefore, again, based on the implementation of pressure/temperature control features, reactor feed pressure design, and reactor pressure design, the pressure relief valve 64 sizes and vessel sizes for the separation system 74 may be limited or reduced relative to what their sizes would be without these measures. For example, limitation on feed pressure relative to the MAWP of the reactors 50A, 50B may eliminate a feed hydraulic overpressure scenario, and may limit potential release scenarios. Thus, a reduction in relief valve sizing and vessel sizing (e.g., the size of the cyclone and/or vessel in the separation system 74) may be obtained. Likewise, the downstream flare knockout pot and flare itself may be relatively smaller in size, such as in a grassroots or new facility. Eliminating or mitigating potential relief scenarios may also be beneficial in a retrofit of an existing plant of tying the discharge of PRVs 64 to an existing flare header 66, for example. In other words, the existing flare header 66, flare knockout pot, and flare may not need to be increased in size in certain examples.

Referring to FIGS. 1-3, with regard to control of the polymerization reactors 50A, 50B, in some embodiments, the relief instrumented system 48 (FIG. 1), which as mentioned may be a component of the control system 46, may be utilized to control reaction conditions such that relief scenarios (e.g., reactor fouling and undesirable reactor conditions) may be avoided or prevented. Specifically, the relief instrumented system 48 (RIS 48) may include a processor, memory, and operational logic that take measurements acquired by process sensors disposed throughout the process and perform certain interlock functions based on the measurements by transmitting signals to operate devices (e.g., block valves) in the manufacturing system 10. In such operations, the RIS 48 may send and receive signals over a network which may include transmission lines and/or wireless features.

In embodiments, the RIS 48 may be configured to activate a kill system to stop or significantly slow the polymerization reaction in reactors 50A, 50B under certain conditions. A reactor kill may include various actions taken to stop a reaction, including isolation of catalyst feed systems, closing of system motor valves, injection of kill fluid (e.g., a catalyst poison) into the reactors 50A, 50B from kill pots or cylinders, and so forth. It should be noted that block valves that are configured to be actuated by the RIS 48 may include position indication features that provide verification of whether the valve operated properly.

In one instance, the RIS 48 is configured to orchestrate at least two basic interlocks that eliminate the excess reaction scenario as a viable relief scenario for relief demand sizing. One interlock injects a catalyst poison or inhibitor into the reactors 50A, 50B to "kill" (i.e., stop or significantly slow) the polymerization reaction. The other interlock isolates the reactors 50A, 50B from feeds, e.g., by closing block valves on the feeds. In particular, this feed-isolation lock interlock isolates the first reactor 50A from diluent (and monomer, comonomer) feed 58A and catalyst feed 60, and isolates the second reactor 50B from diluent (and monomer, comonomer) feed 58A. In certain instances, the transfer line 21L may not be affected by this interlock.

Figure 4:
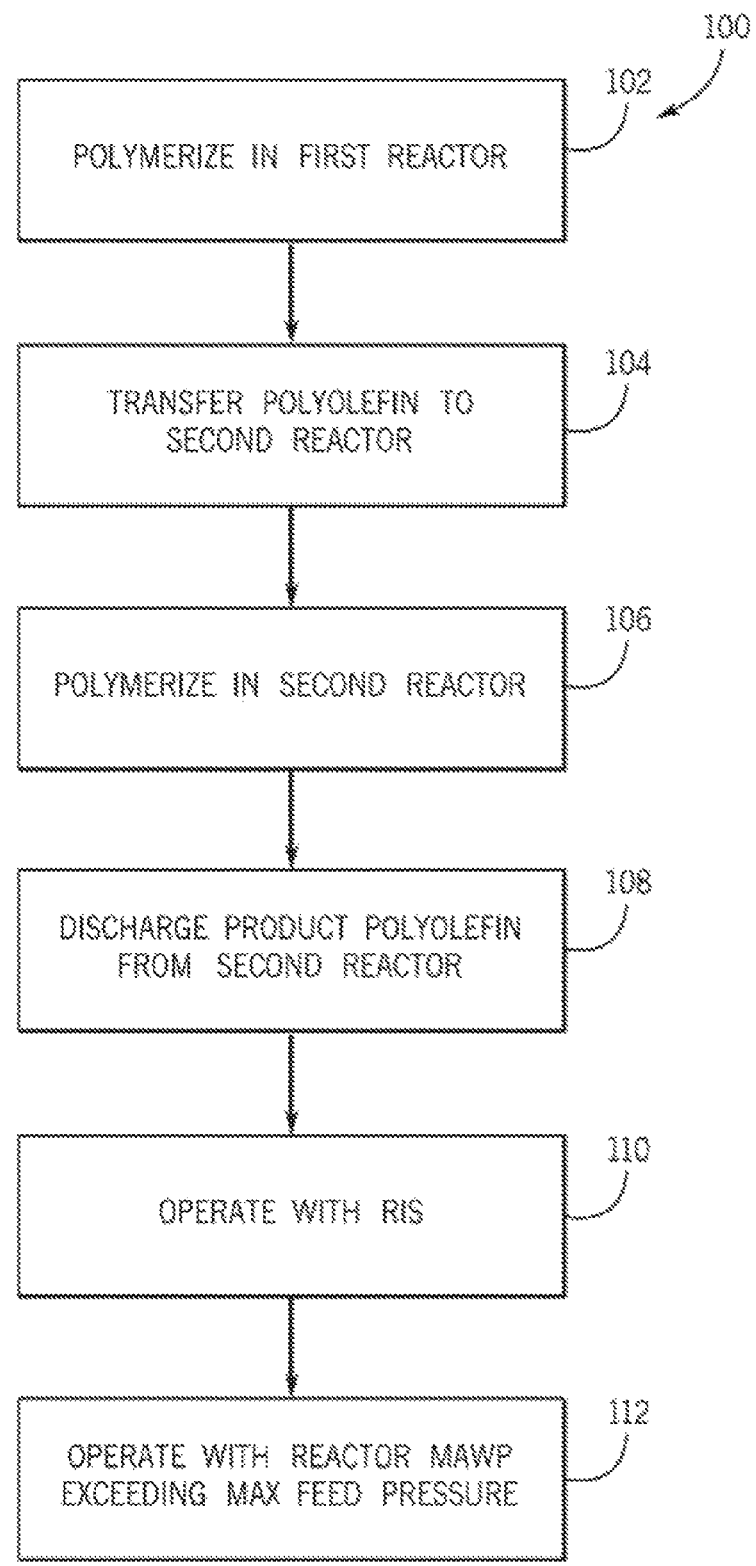
FIG. 4 is a block flow diagram of operating a polyolefin manufacturing system in accordance with embodiments of the present techniques.

FIG. 4 is an exemplary method 100 of operating a polyolefin manufacturing system, including polymerizing (block 102) olefin monomer such as ethylene or propylene in a first polymerization reactor to form a first polyolefin, transferring (block 104 the first polyolefin to a second polymerization reactor, polymerizing (block 106) olefin monomer such as ethylene or propylene in the second reactor to form a second polyolefin, and discharging (block 108) a product polyolefin from the second polymerization reactor. The product polyolefin may include the first polyolefin and the second polyolefin.

Along with the olefin monomer being polymerized in the reactors, the polymerization mixture in the reactors may include diluent, comonomer, hydrogen, etc. Moreover, the olefin monomer polymerized in the second reactor may include carryover of unreacted olefin monomer from the first reactor and/or fresh or recycled olefin monomer added to the second reactor. The polymerization reactors may be loop reactors, autoclave reactors, gas phase reactors, and the like.

The method 100 includes operating (block 110) with pressure relief systems on the polymerization reactors. A polymerization reactor may have multiple pressure relief systems each pressure relief system including or being a pressure safety device (PSD) such as a pressure relief device. Examples of a pressure relief device include a pressure safety valve (PSV), a pressure relief valve (PRV), a rupture disk, and the like.

An individual pressure relief system disposed on a polyolefin polymerization reactor may be a singular pressure relief device. On the other hand, an individual pressure relief system disposed on a polyolefin polymerization reactor may have more than one pressure relief device. In embodiments, a pressure relief system may be a combination of a PRV with a rupture disk installed between the PRV and the reactor. Also, a pressure relief system may be two or more pressure relief devices disposed in parallel, for example.

A reactor pressure relief system on a reactor opens in response to a reactor pressure exceeding a set pressure(s) of the pressure relief system or pressure relief device. For instance, a rupture disk may rupture when the reactor pressure reaches or exceeds the set pressure of the rupture disk. Likewise, a PRV may open when the reactor pressure reaches or exceed the set pressure of the PRV.

Whatever the configuration or device of a given pressure relief system associated with a disposed polyolefin reactor, the method includes operating (block 110) the first reactor with its reactor pressure relief system, and the second reactor with its pressure relief system, both pressure relief systems configured to discharge to a flare system. Piping may route the discharge of a pressure relief system (e.g., a pressure relief device) to a flare header of the flare system.

In alternate embodiments, piping may route the discharge of a pressure relief system (e.g., a pressure relief device) to a separation system (e.g., having a vessel and/or cyclone) configured to collect polyolefin solids and to discharge vapor to the flare system. In examples, the separation system is configured to discharge the vapor to a flare header of the flare system.

The method includes operating (block 112) the polyolefin manufacturing system having a relief instrumented system (RIS) configured to direct at least one process interlock that mitigates an excess reaction scenario of the first reactor or the second reactor, or both, as an overpressure relief scenario. The at least one process interlock may include injecting a catalyst inhibitor into at least the first reactor or the second reactor, and also at least one of isolating a feed from the first reactor or isolating a feed from the second reactor. To isolate a feed from a reactor, the process interlock may close a block valve on a feed to the reactor, shut down a feed pump, divert a feed to another system such as a recycle system and so forth.

Lastly, the method may include operating (block 114) a polyolefin production system having the first reactor and the second reactor each configured with a maximum allowable working pressure (MAWP) that exceeds maximum feed pressure to the first reactor and the second reactor. The centrifugal pumps that deliver feed to the first reactor and the second reactor may deliver a maximum pressure less than the MAWP of the first reactor and the second reactor.

Embodiments of the present techniques provide for a polyolefin production system having a first reactor to polymerize olefin into a first polyolefin and discharge the first polyolefin to a second reactor; and the second reactor to polymerize olefin into a second polyolefin and discharge a product polyolefin having the first polyolefin and the second polyolefin. A pressure relief device (e.g., a PRV, rupture disk, etc.) disposed on the first reactor is configured to relieve to a flare system. Likewise, a pressure relief device (e.g., a PRV, rupture disk, etc.) disposed on the second reactor is configured to relieve to the flare system. The pressure relief devices may relieve to the flare system via discharge piping from the pressure relief devices to a flare header, for example.

Additionally, the polyolefin production system includes a relief instrumented system (RIS) to direct at least one process interlock that mitigates an excess reaction scenario of the first reactor and the second reactor as an overpressure relief scenario. The at least one process interlock may include one interlock to inject a catalyst inhibitor into the first reactor and into the second reactor, and a second interlock to close a block valve on a feed to the first reactor and to close a block valve on a feed to the second reactor. Moreover, the first and second reactors and associated feed pumps may be configured such that the MAWP of the first and second reactors exceeds maximum feed pressure to the first and second reactors.

In alternate embodiments, the pressure relief device (e.g., a PRV, rupture disk, etc.) disposed on the first reactor may be configured to relieve to a separation system. Likewise, the second pressure relief device (e.g., a PRV, rupture disk, etc.) disposed on the second reactor may also be configured to relieve to the separation system. The separation system (e.g., vessel, cyclone, etc.) collects polyolefin solids and/or discharges vapor to the flare system.

Furthermore, in general in one embodiment with respect to the RIS 48, the logic of the RIS 48 may include six interlocks that perform different functions based on detected process values. A first interlock may be referred to as a "high reactor pressure interlock." According to this interlock, a high pressure (e.g., a reactor pressure 15% below a reactor relief pressure) activates a reactor kill to halt any reaction taking place in the reactor 110.

A second interlock may be referred to as a "high-high pressure interlock." According to the high-high pressure interlock, a high-high pressure (e.g., a reactor pressure 10% below a reactor relief pressure), which is higher than the pressure that initiates the high reactor pressure interlock, activates an isolation of the reactor feeds 18 (including 58A, 58B, 60) to the reactors 50A, 50B. The high-high pressure interlock may function to protect the reactors 50A, 50B as well as prevent release of hydrocarbons into the atmosphere.

A third interlock may be referred to as a "high pressure isolation of jacket water heating interlock." According to this interlock, the pressure level that activates the high-high pressure interlock also activates this interlock which closes the steam heating valve (in the jacket water coolant system 53) to the reactor jackets 52. While the high pressure isolation of jacket water heating interlock, like the high-high pressure interlock, may be set at 10% below the reactor relief pressure and may be initiated simultaneously with the high-high pressure interlock, the reliability requirement may be lower. Thus, the output device is not redundant. Further, in some embodiments, the high pressure isolation of jacket water heating interlock may have an activation pressure level that is different from that of the high-high pressure interlock.

Both of the first two interlocks may be based on the same set of three pressure sensors. More specifically, both the first interlock and the second interlock may be based on two out of three pressure readings satisfying pressure criteria. Additionally, the third interlock may utilize one or more of these pressure transmitters and/or a different transmitter. The pressure transmitters may be distributed around the reactors 50A, 50B in various locations. One pressure transmitter may be located adjacent to a pressure transmitter for the reactor pressure control on the primary reactor feed line with the physical location being a separate instrument tap from the reactor pressure control transmitter. This point may closely correspond to the highest pressure in the loop reactors 50A, 50B. This pressure interlock point for the feed point pressure transmitter may be adjusted to compensate for the static pressure difference between the elevations of the reactor relief valve and/or rupture disk and the reactor feed nozzle. A second transmitter may be located on a flush connection at the top ell immediately above the reactor circulation pumps 54A, 54B. This point represents the highest pressure at the top of the reactors 50A, 50B. Based on operational experience, it is now recognized that the relief valve located at this point is the most likely to relieve in the event of hydraulic overpressure. A third pressure transmitter may be located at any convenient location (e.g., a secondary top ell flush location or a secondary reactor feed nozzle location) around the loop reactors 50A, 50B. This third pressure sensing point may be adjusted to account for reactor static pressure difference between the measurement location and the reactor relief valve rupture disk.

A fourth interlock may be referred to a "high temperature interlock," which it operates to isolate the moment (e.g., ethylene) feed to the reactors 50A, 50B. In the case of polyethylene production, this fourth interlock isolates the ethylene feed if any two out of three temperature sensors positioned throughout through a respective reactor 50A, 50B indicate a temperature of 235° F. or higher, or if one valid sensor indicates a temperature of 50° F. higher than any other valid and appropriate temperature sensor of the respective reactor 50A, 50B. The isolation of the ethylene feed provided by the high temperature interlock may prevent the development of isolated high temperature spots in the reactor 50A, 50B.

A fifth interlock may be referred to as a "high deviation from reactor temperature control set point interlock." This fifth interlock initiates a reactor kill if two out of three temperature sensors (e.g., resistance temperature devices) for a given reactor 50A, 50B detect a positive temperature difference from the reactor temperature control set point, and thus, may avoid a runaway reaction. Specifically, according to this interlock, a reactor kill is initiated if two of three temperature sensors of a given reactor 50A, 50B indicate a temperature more than 3° F. (or approximately 3° F.) greater than a reactor set point temperature for Cr resins or more than 4° F. (or approximately 4° F.) greater than a reactor set point temperature for metallocene resins or XPF.

The fourth and fifth interlocks may share the same temperature sensors. Further, the temperature sensors for the control instrumentation and the RIS 48 may include matched RTDs. In other words, the RTDs used for the temperature sensors may be configured to provide the same reading at the same actual temperature. In accordance with present embodiments, empirical reactor temperature data may be collected to develop a normal operating temperature offset between the RIS 48 temperature points and reactor control temperature readings. The normal offset may be due to slight variations in reactor 50A, 50B temperatures around the loop reactor vessel and/or differences in readings between individual RTDs. The normal operating temperature difference information may be used to develop a bias adjustment factor for the RIS 48 temperature readings in order to normalize the temperature readings to the reactor control RTD reading. These temperature sensors may be specifically positioned in certain areas of the reactors 50A, 50B to obtain an increased benefit.

A sixth interlock may be referred to as a "loss of reactor circulation pump interlock," which operates to initiate a reactor kill when a loss of the reactor circulation pump 54A, 54B is identified. This sixth interlock may be based on a one out of two input voting between motor contact status and power meter reading. With regard to interlock design considerations, a low-kilowatt criteria may be selected that is above a main drive motor power draw uncoupled from the pump 54A, 54B. The kilowatt target may be obtained from the reactor circulating pump vendor or developed by measuring reactor circulating pump power draw uncoupled from the reactor circulating pump 54A, 54B. Further, a delayed motor trip may be implemented on the reactor circulating pump motor 56A, 56B to automatically restart the reactor circulating pump 54A, 54B in the event of a minor power interruption. In the event that the duration of any delayed trip is determined to be longer than needed to insure a timely kill, then two power transmitters may be selected as the initiating criteria for this sixth interlock.

In addition to the inclusion of the six interlocks discussed above, in some embodiments, certain interlocks may be specifically excluded for efficiency and improved operation, such as a "coolant pump failure interlock" and a "reactor rupture disk failure interlock," which may operate to manipulate the process (e.g., kill the reaction) in the event of a coolant pump failure or a rupture disk failure, respectively. For example, the high deviation from reactor temperature control set point interlock may detect a coolant pump failure, which generally makes the coolant pump failure interlock unnecessary, and the exclusion of the reactor rupture disk failure interlock may give operators an opportunity to achieve an orderly reactor shut-down when a small leak in the rupture disk occurs, resulting in pressurizing piping between the rupture disk and the relief valve PRV 64.

In the event that a pressure relief scenario of the reactors 50A, 50B is not prevented or deterred by control features such as those discussed above, present embodiments include the PRVs 64, discharge piping 68, separation system 74 (if employed), flare header 66, flare knockout pot, and flare for relief of the pressure in the reactors 50A, 50B. The disclosed relief configurations (FIGS. 2 and 3) generally avoid a direct atmospheric discharge from reactor pressure relief valves (PRVs) 64. As illustrated in FIG. 2, one or more of the PRVs 64, which may be arranged such that they discharge into a flare header 66, and where a downstream flare knockout vessel separates gas/vapor out of the gas/vapor-liquid-solid slurry typically emitted from the reactors 50A, 50B under relief conditions. As illustrated in FIG. 3, the PRVs 64 discharge through the discharge piping 68 to a separation system 74 having a vessel and/or cyclone separate gas/vapor out of the gas/vapor-liquid-solid slurry typically emitted from the reactors 50A, 50B under relief conditions.

If a cyclone is utilized (in the separation system 74 of FIG. 3), after the slurry has entered the cyclone as a result of a relief event, the solid and liquid components of the slurry may fall into an accumulator vessel from the cyclone, while the gas from the slurry passes from the cyclone vessel to a flare header 66. In accordance with some embodiments, the transport of the liquids and solids from the cyclone to the accumulator may be facilitated by gravity and/or pressure. The accumulator may be sized for a partial liquid-solid discharge. Indeed, the partial liquid-solid discharge has been determined to be the process relief scenario that typically produces the most liquid and solid volume plus a design factor. It should be noted that in some embodiments, the cyclone and the accumulator are positioned a minimal or reduced distance from the reactor to reduce plugging between the reactors 50A, 50B and the cyclone and to facilitate transport between the cyclone and the accumulator.

ADDITIONAL DISCLOSURE

Methods and systems for the production for polyolefin have been described. The following clauses are offered as further description:

Embodiment A

A method of operation of a polyolefin manufacturing system, comprising: polymerizing olefin in a first reactor to form a first polyolefin; transferring the first polyolefin to a second reactor polymerizing olefin in the second reactor to form a second polyolefin; discharging a product polyolefin from the second reactor, the product polyolefin comprising the first polyolefin and the second polyolefin; and operation of the first reactor with a first reactor pressure relief system and the second reactor with a second reactor pressure relief system, both pressure relief systems configured to discharge to a flare system; wherein the polyolefin manufacturing system comprises a relief instrumented system (RIS) configured to direct at least one process interlock that mitigates an excess reaction scenario of the first reactor or the second reactor, or both, as an overpressure relief scenario.

Embodiment B

The method of embodiment A, wherein the first pressure relief system comprises a first pressure relief device, and wherein the second pressure relief system comprises a second pressure relief device.

Embodiment C

The method of embodiments A through B, wherein the first pressure relief device comprises a first pressure relief valve, and wherein the second pressure relief device comprises a second pressure relief valve.

Embodiment D

The method of embodiments A through C, wherein the first pressure relief system comprises a first pressure relief valve and a first rupture disk, and wherein the second pressure relief system comprises a second pressure relief valve and a second rupture disk.

Embodiment E

The method of embodiments A through D, wherein the olefin comprises ethylene, and wherein the first and second polyolefins comprises polyethylene.

Embodiment F

The method of embodiments A through E, wherein the at least one process interlock comprises injecting a catalyst inhibitor into at least the first reactor or the second reactor.

Embodiment G

The method of embodiments A through F, wherein the at least one process interlock comprises at least one of isolating a feed from the first reactor or isolating a feed from the second reactor.

Embodiment H

The method of embodiments A through G, wherein the at least one process interlock comprises at least one of closing a block valve on a feed to the first reactor or closing a block valve on a feed to the second reactor.

Embodiment I

The method of embodiments A through H, wherein the at least one process interlock comprises two interlocks comprising one interlock to inject a catalyst inhibitor into at least one of the first reactor or the second reactor, and another interlock to close a first block valve on a first feed to the first reactor and to close a second block valve on a second feed to the second reactor.

Embodiment J

The method of embodiments A through I, wherein the first reactor and the second reactor are each configured with a maximum allowable working pressure (MAWP) that exceeds maximum feed pressure to the first reactor and the second reactor.

Embodiment K

The method of embodiments A through J, wherein centrifugal pumps that deliver feed to the first reactor and the second reactor are configured to deliver a maximum pressure less than a maximum allowable working pressure (MAWP) of the first reactor and the second reactor.

Embodiment L

The method of embodiments A through K, wherein the first reactor pressure relief system is configured to discharge through a first discharge piping to a flare header of the flare system, and the second reactor pressure relief system is configured to discharge through a second discharge piping to the flare header.

Embodiment M

The method of embodiments A through L, wherein the first reactor pressure relief system is configured to open in response to a first reactor pressure exceeding a first set pressure, and wherein the second reactor pressure relief system is configured to open in response to a second reactor pressure exceeding a second set pressure.

Embodiment N

The method of embodiments A through M, comprising at least one of opening the first reactor pressure relief system in response to a first reactor pressure exceeding a first set pressure, or opening the second pressure relief system in response to a second reactor pressure exceeding a second set pressure.

Embodiment O

A method of operating a polyolefin manufacturing system, comprising: polymerizing olefin in a first reactor to form a first polyolefin, the first reactor having a first reactor pressure relief device; transferring the first polyolefin to a second reactor having a second reactor pressure relief device; polymerizing olefin in the second reactor to form a second polyolefin; and discharging a product polyolefin from the second reactor, the product polyolefin comprising the first polyolefin and the second polyolefin; wherein the first and second reactor pressure relief devices are configured to discharge to a separation system configured to collect polyolefin solids and to discharge vapor to a flare system.

Embodiment P

The method of embodiment O, wherein the separation system is configured to discharge the vapor to a flare header of the flare system.

Embodiment Q

The method of embodiments O through P, wherein the separation system comprises a vessel.

Embodiment R

The method of embodiments O through Q, wherein the separation system comprises a cyclone.

Embodiment S

A polyolefin production system comprising: a first reactor configured to polymerize olefin into a first polyolefin and discharge the first polyolefin to a second reactor; the second reactor configured to polymerize olefin into a second polyolefin and discharge a product polyolefin comprising the first polyolefin and the second polyolefin; a relief instrumented system (RIS) configured to direct at least one process interlock that mitigates an excess reaction scenario of the first reactor and the second reactor as an overpressure relief scenario; a first pressure relief device disposed on the first reactor and configured to relieve to a flare system; and a second pressure relief device disposed on the second reactor and configured to relieve to the flare system.

Embodiment T

The polyolefin production system of embodiments, wherein the at least one process interlock comprises one interlock configured to inject a catalyst inhibitor into the first reactor and into the second reactor, and a second interlock configured to close a first block valve on a first feed to the first reactor and to close a second block valve on a second feed to the second reactor.

Embodiment U

The polyolefin production system of embodiments S through T, wherein the first reactor and the second reactor are each configured with a maximum allowable working pressure (MAWP) that exceeds a maximum feed pressure to the first reactor and the second reactor.

Embodiment V

A polyolefin production system comprising: a first reactor configured to polymerize olefin into a first polyolefin and discharge the first polyolefin to a second reactor; the second reactor configured to polymerize olefin into a second polyolefin and discharge a product polyolefin comprising the first polyolefin and the second polyolefin; a relief instrumented system (RIS) configured to direct at least one process interlock that mitigates an excess reaction scenario of the first reactor and the second reactor as an overpressure relief demand scenario; a first pressure relief valve disposed on the first reactor and configured to relieve to a separation system; and a second pressure relief valve disposed on the second reactor and configured to relieve to the separation system.

Embodiment W

The polyolefin production system of embodiment V, wherein the separation system is configured to collect polyolefin solids.

Embodiment X

The polyolefin production system of embodiments V through W, wherein the separation system is configured to discharge vapor to a flare system.

Embodiment Y

The polyolefin production system of embodiments V through X, wherein the separation system comprises a vessel.

Embodiment Z

The polyolefin production system of embodiments V through Y, wherein the separation system comprises a cyclone.

What is claimed is:
1. A method of operating a polyolefin manufacturing system, comprising:
polymerizing olefin in a first reactor to form a first polyolefin;
transferring the first polyolefin to a second reactor in a manner that is continuous and not directly modulated wherein the continuous transfer is controlled by the pressure differential between the first reactor and the second reactor without a CTO valve;
polymerizing olefin in the second reactor to form a second polyolefin;
discharging a product polyolefin from the second reactor, the product polyolefin comprising the first polyolefin and the second polyolefin; and wherein the polyolefin manufacturing system comprises a relief instrumentation system configured to mitigate an excess reaction in the first reactor or the second reactor, or both.

2. The method of claim 1, wherein the first reactor is larger than the second reactor.

3. The method of claim 2, wherein the second reactor is 50% to 90% of the volume of the first reactor.

4. The method of claim 1, wherein the first reactor is smaller than the second reactor.

5. The method of claim 4, wherein the first reactor is 50% to 90% of the volume of the second reactor.

6. The method of claim 1, wherein either the first reactor or the second reactor has a pressure relief system.

7. The method of claim 6, wherein the pressure relief system comprises at least one flush-mounted rupture disk.

8. The method of claim 1, wherein the first and second reactors are loop reactors.

9. The method of claim 8, wherein olefin comprises ethylene, and wherein the first and the second polyolefins comprise polyethylene.

10. The method of claim 1, wherein mitigation comprises one or more of isolation of a catalyst feed system, closing of a system motor valve, injection of a kill fluid, or closing of a block valve on a reactor feed stream.

11. The method of claim 1, further comprising removing light components between the first reactor and the second reactor.

12. The method of claim 1, further comprising transferring the first polyolefin to a hydrocyclone between the first reactor and the second reactor before transferring the first polyolefin to a second reactor.

13. A method of operating a polyolefin manufacturing system, comprising:
   polymerizing olefin in a first reactor to form a first polyolefin having a first weight average molecular weight and a first density;
   transferring the first polyolefin in a manner that is continuous and not directly modulated to a second reactor;
   controlling the continuous and unmodulated transfer of the first polyolefin to the second reactor by controlling the pressure differential between the first and second reactor without a CTO valve;
   polymerizing olefin in the second reactor to form a second polyolefin that has a second weight average molecular weight and a second density different from the first weight average molecular weight and first density;
   discharging a product polyolefin from the second reactor, the product polyolefin comprising the first polyolefin and the second polyolefin; and
   wherein the first and second reactors comprise a pressure relief system configured to a flare system.

14. The method of claim 13, wherein the first reactor is larger than the second reactor.

15. The method of claim 14, wherein the second reactor is 50% to 90% of the volume of the first reactor.

16. The method of claim 13, wherein the first reactor is smaller than the second reactor.

17. The method of claim 16, wherein the first reactor is 50% to 90% of the volume of the second reactor.

18. The method of claim 13, wherein the pressure relief system of the first or the second reactor comprises at least one flush-mounted rupture disk.

19. The method of claim 13, wherein the first and second reactors are loop reactors.

20. The method of claim 19, wherein olefin comprises ethylene, and wherein the first and the second polyolefins comprise polyethylene.

21. The method of claim 13, further comprising removing light components between the first reactor and the second reactor.

22. The method of claim 13, further comprising transferring the first polyolefin to a hydrocyclone between the first reactor and the second reactor before transferring the first polyolefin to a second reactor.

23. A polyolefin production system comprising:
   a first reactor configured to polymerize olefin into a first polyolefin and discharge the first polyolefin to a second reactor;
   the second reactor configured to polymerize olefin into a second polyolefin and discharge a product polyolefin comprising the first polyolefin and the second polyolefin;
   pressure control for controlling the continuous and not directly modulated transfer of the first polyolefin to the second reactor by controlling the pressure differential between the first and second reactor without a CTO valve;
   a first pressure relief valve disposed on the first reactor and configured to provide pressure relief to a separation system;
   a second pressure relief valve disposed on the second reactor and configured to relieve to the separation system; and
   wherein the first pressure relief valve has a set point that is different from the set point of the second pressure relief valve.

24. The system of claim 23, further comprising a flash vessel for separating non-polymer components from polymer fluff.

* * * * *